May 9, 1944.    S. M. KASS    2,348,390
WASHER RETAINER
Filed Oct. 20, 1941
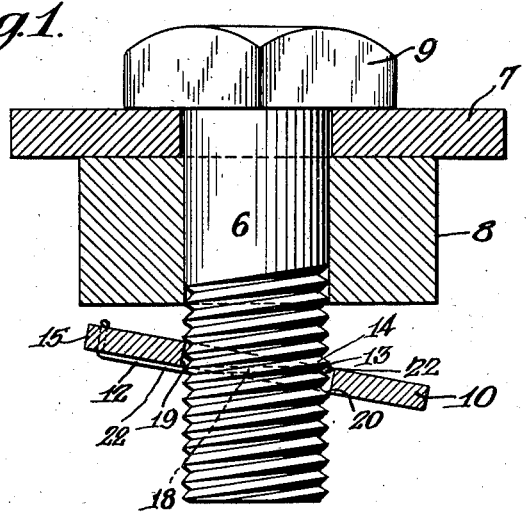
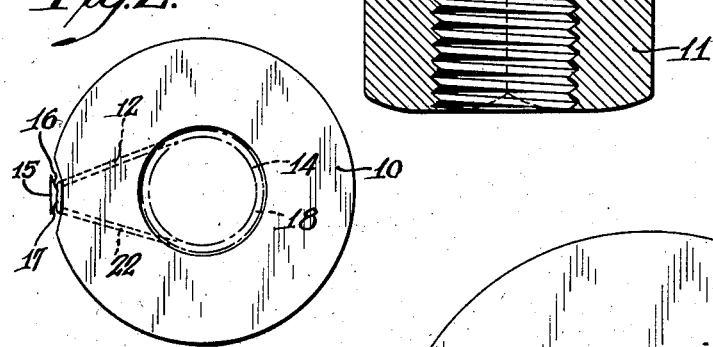
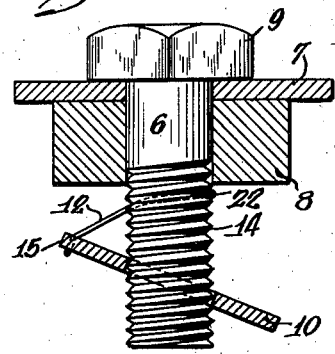
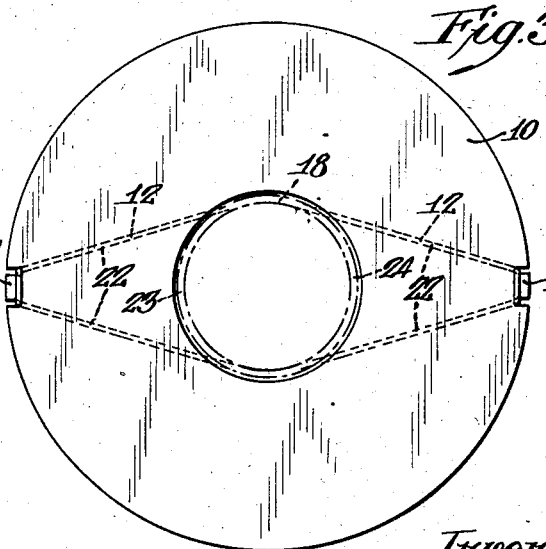
Witness:
Walter Chand
Inventor
Samuel M. Kass
by W Steele Johnson and Son
Attorneys.

Patented May 9, 1944

2,348,390

UNITED STATES PATENT OFFICE 2,348,390

WASHER RETAINER

Samuel M. Kass, Philadelphia, Pa.

Application October 20, 1941, Serial No. 415,729

5 Claims. (Cl. 85—50)

My invention relates to bolt assemblages and particularly to means for supporting a washer upon a downwardly extending bolt until the nut for the bolt may be put in place.

A main purpose is resiliently to support the washer by a flexible cord entering the threads of the bolt.

A further purpose is to press a washer towards the thread of a bolt by the pull of a cord, preferably a rubber band, and at the same time support the washer upon the cord.

A further purpose is to pass a rubber band about the bolt beneath the washer and to engage the rubber band on one side with the washer so as to allow the washer to rest upon the strands of the rubber band and at the same time to force the washer against one side of the bolt.

A further purpose is to provide a prong at the edge of the washer for a rubber support and to pass the rubber support about the bolt so that it engages with the washer near the outer circumference and with the thread of the bolt.

Further purposes will appear in the specification and in the claims.

I have illustrated but two forms, showing forms which are practical, effective and very inexpensive and which well illustrate the principles of the invention.

Figure 1 is a vertical section of a bolt and parts through which the bolt passes along with a washer and nut to be placed upon the bolt.

Figure 2 is a top plan view of the washer and flexible connection used along with a dot and dash showing of the bolt.

Figure 3 is a top plan view of a modified washer with the bolt in dot and dash, similar to Figure 2, but anchoring at opposite sides of the washer.

Figure 4 is a view similar to Figure 1, but illustrating a different position of the parts.

In the drawing similar numerals indicate like parts.

Where bolts of larger size are passed downwardly through structures to be held together, a washer upon the stem of the bolt must be supported in some manner until the nut is started properly upon the end of the bolt. The head of the bolt in many cases must be held when the nut is being started and this does not leave free a hand of a workman to hold the washer. For this reason it is desirable to provide separate support for the washer which is cheap and easily applied and which need not be removed when the nut is set in place. At the present time various means are adopted including in some cases the holding of the washer by a separate workman. I have found that the washer-holding function can be performed by a cord or strand, one end of which is passed about the bolt or along the sides of the bolt and the other end of which is fastened to the washer.

In Figures 1 and 2 the bolt 6 is used to hold a shape or plate 7 to a frame member 8, the shape and frame member being intended to be generic to any members which are held together by a bolt extending generally downwardly.

The head of the bolt 9 rests upon the plate and the washer 10 is intended to be placed below the frame member and between it and the nut 11.

The washer as illustrated may be a plain flat washer or of any standard or special type.

In order that the hands of a workman may be free to hold the head of the bolt and start the nut 11, I support the washer from the threads of the bolt by a flexible connection in the form of a flexible band or a loop 12 preferably a rubber band which surrounds the thread of the bolt, engaging the bottom 13 of one of the threads 14 at one side of the bolt, passing about somewhat more than half of the circumference of the bottom of the thread in Figures 1 and 2 and, at the opposite side of the bolt engaging with any prong or projection 15 in the outer part of the washer. The projection is here left by nicking the washer at 16 and 17. In the best form of the invention the nicks converge so as to provide a flared projection which more surely holds the band after it has been set than would be the case with the straight sided projections 15', for example, seen in Figure 3.

With the structure as shown, several different modes of operation may take place, that illustrated in Figure 1 being the preferred and more general position of the parts as they come to rest.

As illustrated in Figure 1, the washer is pulled toward the right in the figure by the pull of the loop 18 of the band tending to take up the spacing between the left hand portion 19 of the inner circumference of the hole in the washer and the threads. This allows the right hand side of the washer in the position seen to sag, that is, to fall lower than the left hand side of the washer to a point where the lower edge 20 of the right hand interior of the hole in the washer rests against one of the adjacent thread elements of the bolt.

The entire washer drops to a point where the stretches 22 of the rubber band lie below that portion of the loop of the rubber band which engages within the groove of the thread. This being the case the left hand sectioned portion of the washer rests upon these stretches 22 of the rubber band, which is attached to the outer part of the washer.

In Figure 4 on a reduced scale is shown a poor but nevertheless workable manner of use of the construction of Figure 1 in which the washer and band are reversed in position so that the band extends above the washer and stretches from the bottom of a thread at the right across to the prong or fastener. In this case there is a direct pull upon the band in the stretches between the contact with the bolt and the prong, the washer being supported in part in this way and in part by the additional friction with the bolt or through the inner part of the washer resting upon a "shelf" of the thread. In this form also the operation is improved and the device is more easily applied if the band be resilient such as a rubber band.

The rubber band is very cheap, yet makes the best support known to me because it is a closed resilient ring and can be stretched to provide ease of placement and is capable of being very quickly and easily assembled upon the bolt. Part of the function of the invention could be performed by using a loop of string which is placed upon the bolt below the washer. The string is placed about the bolt before the loop is fastened to the washer. The loop is subsequently passed over a prong or hook or projection 15.

Though the rubber band form is well suited for use with a washer having two or more prongs or projections such as the opposite prongs or projections 15' in Figure 3, this Figure 3 form lends itself more to the use of a loop of string for example than does the structure of Figures 1 and 2 because the loop in this case will be much larger than the loop in Figures 1 and 2 and can more easily be placed about the bolt.

In Figure 3 the washer has two prongs 15' and 15' on opposite sides of the bolt thread so that the rubber band or loop may be hooked over each of these prongs or hooks and between them may pass about opposite parts 23 and 24 of the thread of the bolt.

The inner surfaces of the hole in the washer may rest upon the shoulders formed by the downwardly and outwardly sloping thread surfaces of the thread. This may be true at the left where the washer is pulled against the thread and may be true also at the right where gravity causes the washer edge to rest against the thread.

In the form of Figure 2 a single rubber band or cord or the like is used. It preferably does not completely encircle the bolt but engages within a thread groove for perhaps two-thirds or three-quarters of the bolt's circumference and is fastened to the washer at the outer perimeter of the washer.

In the form of Figure 3 the preferred form of operation is to pass a rubber band or cord from one point of washer attachment, let us say left 15' to the opposite point of attachment at right 15' engaging within the thread groove for perhaps a sixth of the length of the thread on one side and a sixth of the length of the thread on the opposite side but not engaging the bolt at the point where the lead lines of reference characters 23 and 24 are located. On the other hand quite obviously two separate bands can be used, one corresponding with the Figure 2 illustration surrounding perhaps two-thirds to three-quarters along the thread groove and the other band corresponding in its position and operation to Figure 2 after it has been turned 180°.

Having thus described my invention what I claim as new and desire to secure by Letters Patent is:

1. In a device for holding a washer on a bolt used with parts through which the bolt passes downwardly, a washer surrounding the bolt below the parts and flexible sustaining means for the washer surrounding the bolt, engaging with the threads of the bolt and connected to the outer circumference of the washer at one side of the bolt.

2. In a device for holding a washer on a bolt, a washer upon the bolt having engaging means near the outer circumference of the washer and a rubber band passing about the bolt beneath the washer and secured to the washer by the engaging means.

3. As a means of holding a washer upon a downwardly extending bolt, the combination of a bolt, a washer and a flexible band passing about the bolt within the groove of a thread in the bolt and passing beneath the washer and engaging the outer part of the washer whereas the washer at one side rests upon the flexible band.

4. In mechanism for holding a washer upon a downwardly extending bolt, a bolt, a washer and a resilient support for the washer extending from the outer edge of the washer transversely of the bolt and beyond the bolt, engaging and resting within the threads of the bolt, attached to the washer, following the face surface of and supporting the portion of the washer between the point of attachment to the washer and the bolt.

5. In a device for holding a washer on a bolt, a washer carried by the bolt at a distance from the head of the bolt along the length of the threaded part of the bolt, an elastic band in loop form secured at opposite ends of the loop to the washer at opposite points on the perimeter of the washer and engaging threaded parts of the bolt within the bottoms of the threads resiliently to pull the washer toward the bolt and provide support for the washer in the stretches of the band between the bolt and the outer part of the washer.

SAMUEL M. KASS.